United States Patent
Kim

[19]

[11] Patent Number: 6,011,430
[45] Date of Patent: Jan. 4, 2000

[54] METHOD AND CIRCUIT FOR REDUCING NOISE

[75] Inventor: Yeong-taeg Kim, Suwon, Rep. of Korea

[73] Assignee: Samsung Electronics Co., Ltd., Kyungki-Do, Rep. of Korea

[21] Appl. No.: 08/842,831

[22] Filed: Apr. 17, 1997

[30] Foreign Application Priority Data

Apr. 17, 1996 [KR] Rep. of Korea ............. 96-11623

[51] Int. Cl.[7] .................................................. H03K 5/00
[52] U.S. Cl. ...................... 327/551; 327/552; 348/606; 348/607
[58] Field of Search ................................. 322/551, 552, 322/34; 348/607, 606, 663, 616; 73/35.03

[56] References Cited

U.S. PATENT DOCUMENTS

| | | | |
|---|---|---|---|
| 4,467,634 | 8/1984 | Rohde et al. | 73/35 |
| 5,379,074 | 1/1995 | Hwang | 348/606 |
| 5,414,472 | 5/1995 | Hwang | 348/616 |
| 5,686,972 | 11/1997 | Kim | 348/663 |

*Primary Examiner*—Dinh T. Le
*Attorney, Agent, or Firm*—Sughrue, Mion, Zinn, Macpeak & Seas, PLLC

[57] ABSTRACT

A noise reduction method and circuit determines the presence of an impulse component in a current input sample by generating two windows of different size and detecting the impulse component in the two respective windows in order to prevent degradation of an input image signal due to an erroneous detection. If the impulse component is not detected in the sample, the sample is bypassed. However, if the impulse component is detected, the sample is trimmed by a trimmed mean filter and then output.

21 Claims, 8 Drawing Sheets

METHOD AND CIRCUIT FOR REDUCING NOISE

FIELD OF THE INVENTION

The present invention relates to a method and a circuit for reducing noise, and more particularly, to a method and circuit for effectively suppressing the impulse noise in an image signal.

BACKGROUND OF THE INVENTION

Generally, an independent impulse noise is uniformly distributed over a frequency domain. When only a linear filter is used to remove the impulse noise, the high frequency component of the impulse noise is not effectively removed so that the details of the image are blurred.

Thus, a significant effort has been expended in various fields to deal with the impulse noise of a white nature based on the nonlinear filtering scheme described in the following literature: [1] D. H. Sargarad and J. W. Modestino, "Errors-and-Erasures Coding to Combat Impulse Noise on Digital Subscriber Loop", IEEE Transactions on Communications, vol. 38, pp. 1145–1155, Aug. 1990; [2] J. W. Lechleider, "An Adaptive Impulse Noise Canceller for Digital Subscriber Lines", Proc. of the GLOBECOM, vol. 1, pp. 36–39, December 1992, Orlando, Fla. USA; [3] G. A. Williamson, P. M. Clarkson, and W. A. Sethares, "Performance Characteristics of the Median LMS Adaptive Filter", IEEE Tr. on Signal Processing, pp. 667–680, Feb. 1993; and [4] S. R. Kim and A. Efron, "Adaptive Robust Impulse Noise Filtering," IEEE Transactions on Signal Processing, pp.

SUMMARY OF THE INVENTION

It is an object of the present invention to provide a noise reduction method which can effectively suppress an outlier due to an impulse noise in an image signal, and to provide a circuit suitable for implementing the method.

It is another object of the present invention to provide a noise reduction method which can effectively suppress outliers due to severe impulse noises in an image signal through recursive filtering, and a circuit suitable for implementing the method.

It is still another object of the present invention to provide a noise reduction method which can effectively suppress aliasing which can arise around the low horizontal frequency region due to an interlaced scanning as well as an impulse noise, and to provide a circuit suitable for implementing the method.

To accomplish the above objects, there is provided a noise reduction method comprising the steps of: (a) generating a plurality of windows having different sizes and including an input sample; (b) obtaining an average sample value and an absolute deviation mean of samples with respect to the respective windows; (c) detecting the presence of an impulse component in an input signal by using the average sample value and the absolute deviation mean of samples with respect to the respective windows; and (d) trimming the samples in a trimming window of a predetermined size if the impulse component exists in the input signal, otherwise, bypassing the input signal.

Also, there is provided a noise reduction circuit for reducing noise by suppressing a detected impulse component in an input signal, comprising: window generating means for generating a plurality of windows of different sizes including an input sample; outlier detecting means for determining whether the input signal is an outlier by obtaining an average sample value and an absolute deviation mean of samples of the respective windows; means for generating a selection control signal if the input signal is determined to be an outlier in said outlier detecting means; trimming means for trimming the samples in a trimming window of a predetermined size and outputting the trimmed signal; and selection means for outputting the trimmed signal as an output signal if the impulse component exists in the input signal, and otherwise outputting the input signal unchanged as the output signal, in accordance with the selection control signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
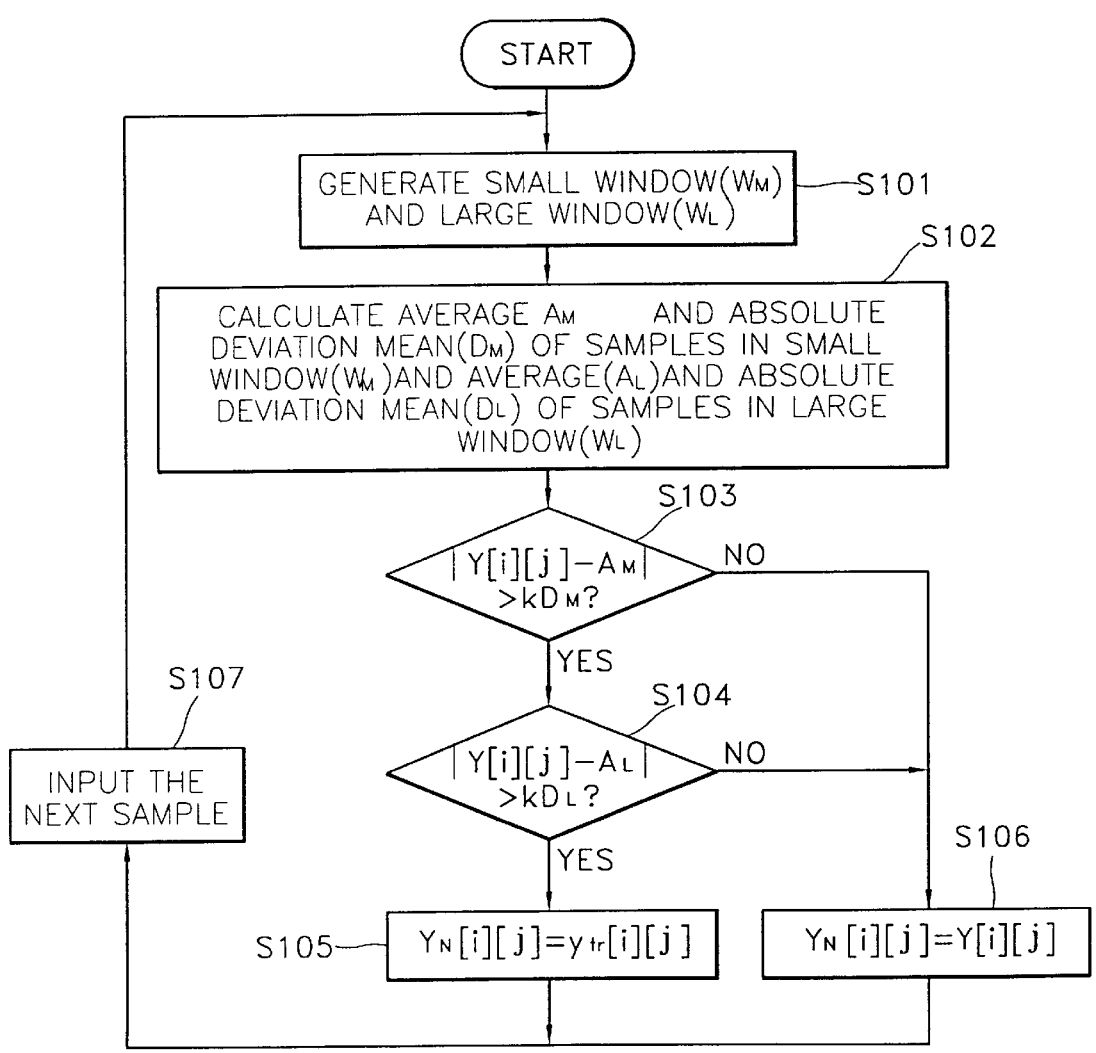
FIG. 1 is a flowchart illustrating an embodiment of the noise reducing method according to the present invention.

A noise reduction method proposed in the present invention determines whether or not an impulse component exists in a present input sample based on a comparison of the statistics of the samples in two different windows having different dimensions in order to prevent deterioration of an input image signal due to an erroneous impulse detection. If an impulse is not detected in the present sample, the sample is bypassed. On the other hand, if an impulse is detected, the sample is trimmed by a trimmed mean filter so that a trimmed sample is output.

First, a window $W_M$ constituted by samples of a two dimensional (2-D) video signal which is being input is defined by the following equation.

$$W_M = \begin{bmatrix} w_{-M1}^{-M2} & \cdots & w_{-M1}^{0} & \cdots & w_{-M1}^{M2} \\ \vdots & & \vdots & & \vdots \\ w_{0}^{-M2} & \cdots & w_{0}^{0} & \cdots & w_{0}^{M2} \\ \vdots & & \vdots & & \vdots \\ w_{M1}^{-M2} & \cdots & w_{M1}^{0} & \cdots & w_{M1}^{M2} \end{bmatrix} \quad (1)$$

$$= \begin{bmatrix} Y[i-M_1][j-M_2] & \cdots & Y[i-M_1][j] & \cdots & Y[i-M_1][j+M_2] \\ \vdots & & \vdots & & \vdots \\ Y[i][j-M_2] & \cdots & Y[i][j] & \cdots & Y[i][j+M_2] \\ \vdots & & \vdots & & \vdots \\ Y[i+M_1][j-M_2] & \cdots & Y[i+M_1][j] & \cdots & Y[i+M_1][j+M_2] \end{bmatrix} \quad (1.1)$$

Here, the size of the window $W_M$ is $(2M_1+1)\times(2M_2+1)$, and the sample $Y[i][j]$ in the center denotes an input sample to be filtered at present.

Meanwhile, the average sample value $A_M$ of the window $W_M$ is calculated as follows.

$$A_M = \frac{1}{(2M_1+1)(2M_2+1)} \sum_{l=-M_1}^{M_1} \sum_{m=-M_2}^{M_2} w_l^m \quad (2)$$

Also, the absolute deviation mean $D_M$ of the samples in the window $W_M$ is calculated as follows.

$$D_M = \frac{1}{(2M_1+1)(2M_2+1)} \sum_{l=-M_1}^{M_1} \sum_{m=-M_2}^{M_2} |w_l^m - A_M| \quad (3)$$

The above definition of the absolute deviation mean $D_M$ is similar to that of the sample variance in statistics. The absolute deviation mean $D_M$ signifies an average distance of the samples from the mean $A_M$. Combining the significance behind the definition of the absolute deviation mean $D_M$ and the fact that the impulse noise typically has a large amplitude compared with a normal signal, an impulse detection rule can be obtained as follows.

Detection Rule [1]

If $|Y[i][j]-A_M|$ is larger than $kD_M$, the sample $Y[i][j]$ contains an impulse component.

Here, the designation k is a constant.

This rule can easily be understood since the value of $|Y[i][j]-A_M|$ is much larger than the absolute deviation mean $D_M$ which corresponds to an average of the $|Y[i][j]-A_M|$ values if the $Y[i][j]$ is an outlier.

However, it should be noted that the detection rule [1] is a function of the window. In other words, the rule [1] completely depends on the characteristics of the window. That is, windows of different dimensions output different results of detection.

To enhance the reliability of the detection, another window $W_L$ having a size different from that of the window $W_M$ in equation (1) is further considered.

$$W_L = \begin{bmatrix} w_{-L1}^{-L2} & \cdots & w_{-L1}^{0} & \cdots & w_{-L1}^{L2} \\ \vdots & & \vdots & & \vdots \\ w_{0}^{-L2} & \cdots & w_{0}^{0} & \cdots & w_{0}^{L2} \\ \vdots & & \vdots & & \vdots \\ w_{L1}^{-L2} & \cdots & w_{L1}^{0} & \cdots & w_{L1}^{L2} \end{bmatrix} \quad (4)$$

$$= \begin{bmatrix} Y[i-L_1][j-L_2] & \cdots & Y[i-L_1][j] & \cdots & Y[i-L_1][j+L_2] \\ \vdots & & \vdots & & \vdots \\ Y[i][j-L_2] & \cdots & Y[i][j] & \cdots & Y[i][j+L_2] \\ \vdots & & \vdots & & \vdots \\ Y[i+L_1][j-L_2] & \cdots & Y[i+L_1][j] & \cdots & Y[i+L_1][j+L_2] \end{bmatrix} \quad (4.1)$$

Here, it is assumed that $L_1$ is greater than or equal to $M_1$ and $L_1$ is greater than or equal to $M_2$. Geometrically, the centers of the windows $W_M$ and $W_L$ are the same, which is $Y[i][j]$. Thus, all the samples in the window $W_M$ are included in the window $W_L$. Consequently, the windows $W_M$ and $W_L$ are referred to as a small and a large windows, respectively, hereinbelow.

Similarly, the average sample value $A_L$ of the large window $W_L$ is calculated as follows.

$$A_L = \frac{1}{(2L_1+1)(2L_2+1)} \sum_{l=-L_1}^{L_1} \sum_{m=-L_2}^{L_2} w_l^m \quad (5)$$

Also, the absolute deviation mean $D_L$ of the samples in the large window $W_L$ is calculated as follows.

$$D_L = \frac{1}{(2L_1+1)(2L_2+1)} \sum_{l=-L_1}^{L_1} \sum_{m=-L_2}^{L_2} |W_l^m - A_L| \qquad (6)$$

Based on the parameters defined in connection with the large and small windows $W_L$ and $W_M$, a detection rule [2] which is more reliable than the detection rule [1] is given as follows.

Detection Rule [2]

If $|Y[i][j]-A_M|$ is larger than $kD_M$ and $|Y[i][j]-A_L|$ is larger than $kD_L$ the sample $Y[i][j]$ contains an impulse component.

Since the detection rule [2] further considers the possibility of sample's being an outlier in the large window $W_L$, the number of the samples $Y[i][j]$ determined to contain a impulse component is reduced when the detection rule [2] is applied compared with the case in which the detection rule [1] is applied. In other words, the detection rule [2] detects fewer impulses than the detection rule [1]. Consequently, it can be said that the detection rule [2] is more strict than the detection rule [1].

On the other hand, during the removal of an impulse noise in a real image sample, the sample determined to contain the impulse is replaced with the other value. At this time, an erroneous detection which regards a sample which contains no impulse as containing an impulse results in a picture quality degradation of the filtered output, e.g., a blurring.

Thus, in order to prevent the picture quality from degrading, it is preferable to use the detection rule [2] which keeps the details of the input image at the cost of removing less impulses.

In the detection rule [2], if the impulse component is not detected in the input sample $Y[i][j]$, the final output $Y_N[i][j]$ of a noise reduction system proposed in the present invention is given as follows.

$$Y_N[i][j] = Y[i][j] \qquad (7)$$

This means that the final output is bypassed in such a case.

In case that an impulse component is detected in the sample $Y[i][j]$, a filtering by a k-trimmed mean filter on the basis of the small window $W_M$ is considered. Here, a trimming is a filtering scheme well known from the following literature which disclose a non-linear filtering scheme: [5] J. B. Bednar and T. L. Watt, "Alpha-Trimmed Means and Their Relationship to Median Filters," IEEE Transactions on Acoustics, Speech, and Signal Processing, pp. 145–153, Feb., 1984; and [6] A. Restrepo and A. Bovik "Adaptive Trimmed Mean Filters for Image Restoration," IEEE Transactions on Acoustics, Speech, and Signal Processing, pp. 1326–1337, Aug., 1988.

Meanwhile, a trimming window $T_M$ for trimming an outlier in the small window $W_M$ is defined as follows.

$$T_M = \qquad (8)$$

$$\begin{bmatrix} T[i-M_1][j-M_2] & \cdots & T[i-M_1][j] & \cdots & T[i-M_1][j+M_2] \\ \vdots & & \vdots & & \vdots \\ T[i][j-M_2] & \cdots & T[i][j] & \cdots & T[i][j+M_2] \\ \vdots & & \vdots & & \vdots \\ T[i+M_1][j-M_2] & \cdots & T[i+M_1][j] & \cdots & T[i+M_1][j+M_2] \end{bmatrix}$$

where, $$T[i+l][j+m] = \begin{cases} 0, & \text{if } |w_l^m - A_m| > kD_M \\ 1, & \text{otherwise} \end{cases} \qquad (9)$$

Here, the case that $T[i+l][j+m]$ is equal to zero means that $W_l^M$ includes an outlier in the small window $W_M$. The output of the trimmed mean filter is determined according to the following equation (10) on the basis of the trimming window.

$$y_{tr}[i][j] = \frac{1}{|T_M|} \sum_{l=-M_1}^{M_1} \sum_{m=-M_2}^{M_2} w_l^m T[i+l][j+m] \qquad (10)$$

where, $$|T_M| = \sum_{l=-M_1}^{M_1} \sum_{m=-M_2}^{M_2} T[i+l][j+m] \qquad (11)$$

and $|T_M|$ denotes the number of non-trimmed samples. If $|T_M|$ is equal to zero, all the samples are outliers. Such a phenomenon occurs when all the samples in the window are affected by positive and negative impulses evenly. In such a case, an output signal is given by the following equation (12).

$$y_{tr[i][j]} = A_M \qquad (12)$$

The degree of trimming is controlled by the constant k. For example, there will be no trimmed samples if the constant k is infinity; while all the samples in the window will be trimmed out if k is zero. Thus, if the constant is selected properly depending on channel conditions, various noise removal characteristics can be obtained.

To summarize, the output of the noise reduction system is given by the following equation (13).

$$Y_N[i][j] = \qquad (13)$$
$$\begin{cases} y_{tr}[i][j], & \text{if } |Y[i][j]-A_M| > kD_M \wedge |Y[i][j]-A_L| > kD_L \\ Y[i][j], & \text{otherwise} \end{cases}$$

The algorithms described above are directed to the reduction of nonrecursive noise, which will be explained with reference to FIG. 1, as follows.

FIG. 1 is a flowchart illustrating an embodiment of the noise reducing method according to the present invention.

In FIG. 1, a small window $W_M$ and a large window $W_L$ represented by the equations (1.1) and (4.1), respectively, are generated (step 101).

The average sample value $A_M$ of the small window $W_M$ and the absolute deviation mean $D_M$ of the samples in the small window $W_M$ are calculated by use of the equations (2) and (3), respectively. Also, the average sample value $A_L$ of the large window $W_L$ and the absolute deviation mean $D_L$ of the samples in the large window $W_L$ are calculated by use of the equations (5) and (6), respectively (step 102).

It is determined that the input sample contains an impulse only if the impulse exists in both the small and the large windows $W_M$ and $W_L$ according to the detection rule [2], that is, $|Y[i][j]-A_M|$ is larger than $kD_M$ and $|Y[i][j]-A_L|$ is larger than $kD_L$. When it is determined that the input sample contains an impulse, the output $y_{tr}[i][j]$ obtained by trimming an input sample by use of the trimmed mean filter is output as a final output $Y_N[i][j]$ (steps 103–105). On the other hand, when the input sample does not contain an impulse, the input sample $Y[i][j]$ is bypassed just as it is and output as the final output $Y_N[i][j]$ (step 106).

After the steps 105 and 106, a next sample is input, and trimmed or bypassed depending on whether or not an impulse exists in the sample in order to reduce noise (step 107).

Meanwhile, a recursive filtering scheme in which a filtered output is used for filtering the next sample is very useful in removing severe impulse noises.

In the recursive filtering, the small and the large windows are defined by equations (1.2) and (4.2), respectively.

$$W_M = \begin{bmatrix} Y_N[i-M_1][j-M_2] & \ldots & Y_N[i-M_1][j] & \ldots & Y_N[i-M_1][j+M_2] \\ \vdots & & \vdots & & \vdots \\ Y_N[i][j-M_2] & \ldots & Y[i][j] & \ldots & Y[i][j+M_2] \\ \vdots & & \vdots & & \vdots \\ Y[i+M_1][j-M_2] & \ldots & Y[i+M_1][j] & \ldots & Y[i+M_1][j+M_2] \end{bmatrix} \quad (1.2)$$

$$W_L = \begin{bmatrix} Y_N[i-L_1][j-L_2] & \ldots & Y_N[i-L_1][j] & \ldots & Y_N[i-L_1][j+L_2] \\ \vdots & & \vdots & & \vdots \\ Y_N[i][j-L_2] & \ldots & Y[i][j] & \ldots & Y[i][j+L_2] \\ \vdots & & \vdots & & \vdots \\ Y[i+L_1][j-L_2] & \ldots & Y[i+L_1][j] & \ldots & Y[i+L_1][j+L_2] \end{bmatrix} \quad (4.2)$$

Here, $Y_N$ denotes a filtered sample. The recursive filtering scheme is almost the same as the nonrecursive filtering scheme except for the window generation method.

The recursive mode of the impulse noise removing method based on the windows $W_M$ and $W_L$ will be described hereinbelow.

Figure 2:
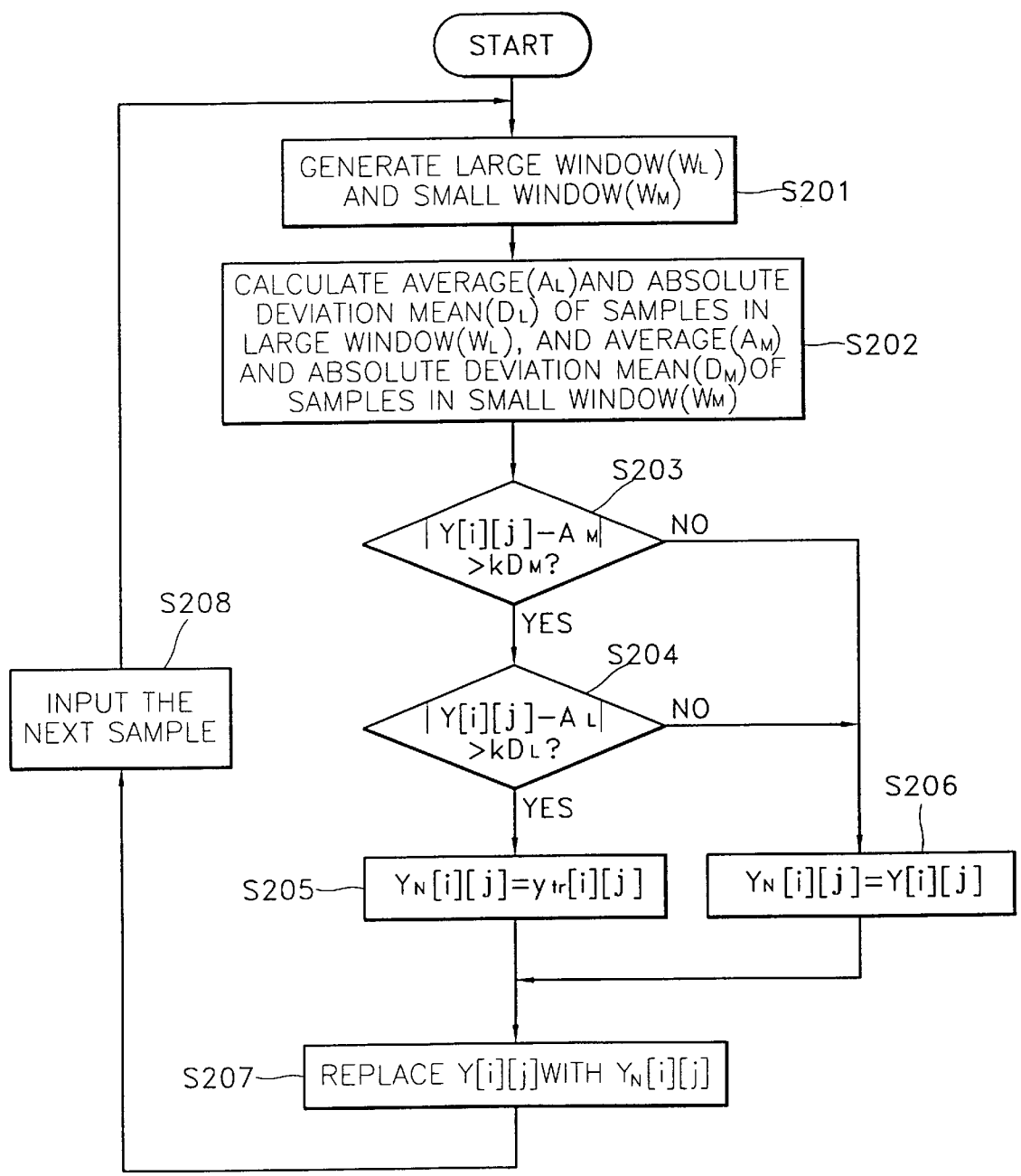
FIG. 2 is a flowchart illustrating another embodiment of the noise reducing method according the present invention.

FIG. 2 is a flowchart illustrating another embodiment of the noise reducing method according to the present invention.

Referring to FIG. 2, a small window $W_M$ and a large window $W_L$ for the recursive noise reduction are generated by use of the equations (1.2) and (4.2), respectively (step 201).

The average sample value $A_M$ of the small window $W_M$ and the absolute deviation mean $D_M$ of the samples in the small window $W_M$ are calculated by use of the equations (2) and (3), respectively. Also, the average sample value $A_L$ of the large window $W_L$ and the absolute deviation mean $D_L$ of the samples in the large window $W_L$ are calculated by use of the equations (5) and (6), respectively (step 202).

If the input sample $Y[i][j]$ contains an impulse in both the small and the large windows $W_M$ and $W_L$ according to the detection rule [2], that is, $|Y[i][j]-A_M|$ is larger than $kD_M$ and $|Y[i][j]-A_L|$ is larger than $kD_L$ the output $y_{tr}[i][j]$ obtained by trimming the samples within the small window $W_M$ by use of the trimmed mean filter is output as a final output $Y_N[i][j]$ (step 203–205). Meanwhile, if the input sample $Y[i][j]$ does not contain any impulse in either the small or the large windows $W_M$ and $W_L$, the input sample $Y[i][j]$ is bypassed just as it is and output as the final output $Y_N[i][j]$ (step 206).

After the steps 205 and 206, the input sample $Y[i][j]$ is replaced with the final output $Y_N[i][j]$ (step 207). Afterwards a next sample is input, and trimmed or bypassed depending on whether or not an impulse exists in the sample in order to reduce noises (step 208).

The above recursive or nonrecursive filtering schemes can easily be applied to remove the impulse in a one-dimensional signal (e.g., a communication signal), without any restriction. That is, if $L_1$ and $M_1$ are zero, the forgoing methods become a one-dimensional impulse removal system.

Meanwhile, when the algorithm proposed in the present invention is applied to an image interlaced in an intra-field mode, a desired frequency characteristic varying from a low-pass penetrating filter to an all-pass filter can be obtained by changing the value of the parameter k even though an aliasing occurs around a low horizontal frequency component region.

At this time, the aliasing results from the interlacing. In order to reduce the aliasing around the low horizontal frequency region, the following horizontal filtering structure is combined with the algorithm described above.

The horizontal vector $V_L$ having a length $(2L_2+1)$ is defined as follows.

$$V_L = [V_{L2}, \ldots, V_0, \ldots, V_{L2}]$$

$$= \begin{cases} [Y[i][j-L_2], \ldots, Y[i][j], \ldots, Y[i][j+L_2]], \\ \quad \text{in nonrecursive mode} \\ [Y_N[i][j-L_2], \ldots, Y[i][j], \ldots, Y[i][j+L_2]], \\ \quad \text{in recursive mode} \end{cases}$$

The horizontal vector is a central row vector of the large window $W_L$ defined by the equations (4.1) and (4.2). An amount of a horizontal component H, or to be more specific, the amount of a horizontal high frequency component (hereinafter, referred to as a "horizontal amount") is calculated by use of a predetermined weighting vector $w = [W_{-L2}, \ldots, W_0, \ldots, W_{L2}]$ as follows.

$$H = |V_L w^t| \quad (15)$$

$$= \left| \sum_{l=-L_2}^{L_2} V_l w_l \right|$$

where, t denotes a vector transpose.

The noise reduction algorithm according to the present invention summarized by the equation (13) is changed into the following equation (16) based on the horizontal amount H.

$$Y_{N[i][j]} = \begin{cases} y_{tr[i][j]}, & \text{if } |Y[i][j] - A_M| > kD_M \\ & |Y[i][j] - A_L|kD_L, \text{ and } H > T \\ Y[i][j], & \text{otherwise} \end{cases} \quad (16)$$

where, T is a constant. Thus, even though the examined sample according to the detection rule [2] is determined to contain an impulse, the input sample is bypassed when the horizontal amount H is smaller than or equal to the constant T since it is not sure whether the outlier detected by the detection rule [2] is the result of the impulse or the aliasing due to the intra-field filtering. Therefore, the aliasing due to the interlacing is prevented.

A description of the above algorithm will now be given with reference to FIG. 3.

Figure 3:
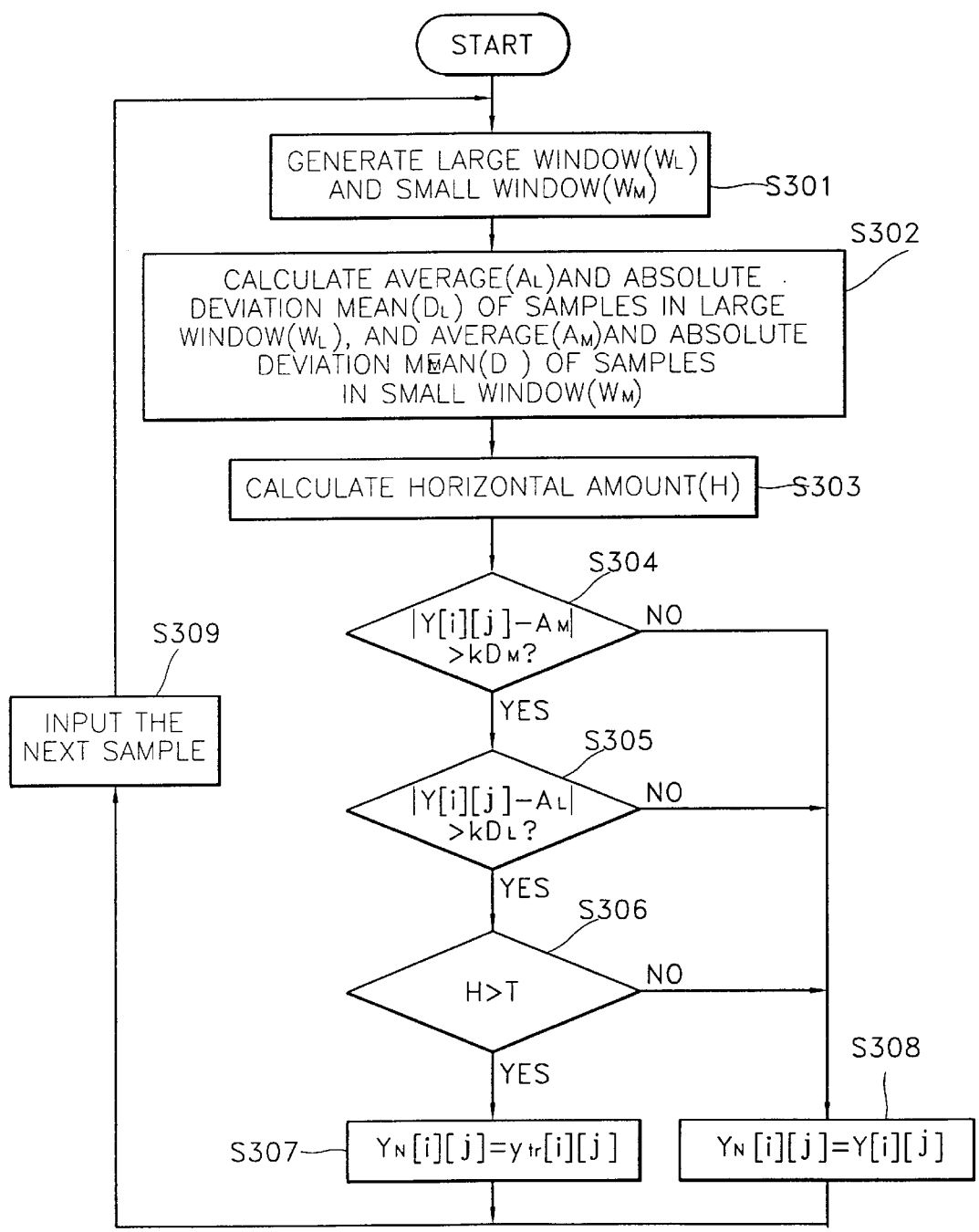
FIG. 3 is a flowchart illustrating still another embodiment of the noise reducing method according to the present invention.

FIG. 3 is a flowchart illustrating still another embodiment of the noise reducing method according to the present invention.

Referring to FIG. 3, small and large windows $W_M$ and $W_L$ for the recursive noise reduction are generated by use of the equations (1.2) and (4.2) (step 301).

The average sample value $A_M$ of the small window $W_M$ and the absolute deviation mean $D_M$ of the samples in the small window $W_M$ are calculated by use of the equations (2) and (3), respectively. Also, the average sample value $A_L$ of the large window $W_L$ and the absolute deviation mean $D_L$ of the samples in the large window $W_L$ are calculated by use of the equations (5) and (6), respectively (step 302).

Then, the horizontal amount H is calculated according to the equation (15) by use of a central row vector of the large window $W_L$ and a predetermined weighted vector (step 303).

If the input sample Y[i][j] contains an impulse in both the small and the large windows $W_M$ and $W_L$ according to the detection rule [2] and the horizontal amount H is larger than a predetermined constant T, the output $Y_{tr}[i][j]$ obtained by trimming the input samples by use of the trimmed mean filter is output as a final output $Y_N$ [i][i] (step 304–307). Meanwhile, if the input sample Y[i][j] does not contain any impulse in either the small or the large windows $W_M$ and $W_L$ or the horizontal amount H is not larger than a predetermined constant T, the input sample Y[i][j] is bypassed just as it is and output as the final output $Y_N$ [i][j] (step 308).

After the steps 307 and 308, a next sample is input, and trimmed or bypassed depending on whether an impulse exists in the sample or not in order to reduce noise (step 309).

Even though the nose reduction method shown in FIG. 3 was described in terms of the nonrecursive impulse noise reduction mode of FIG. 1, the method can also be applied to the recursive impulse noise reduction mode of FIG. 2.

Next, a preferred embodiment of the noise reduction circuit according to the present invention will be described with reference to FIGS. 4 to 8.

Figure 4:
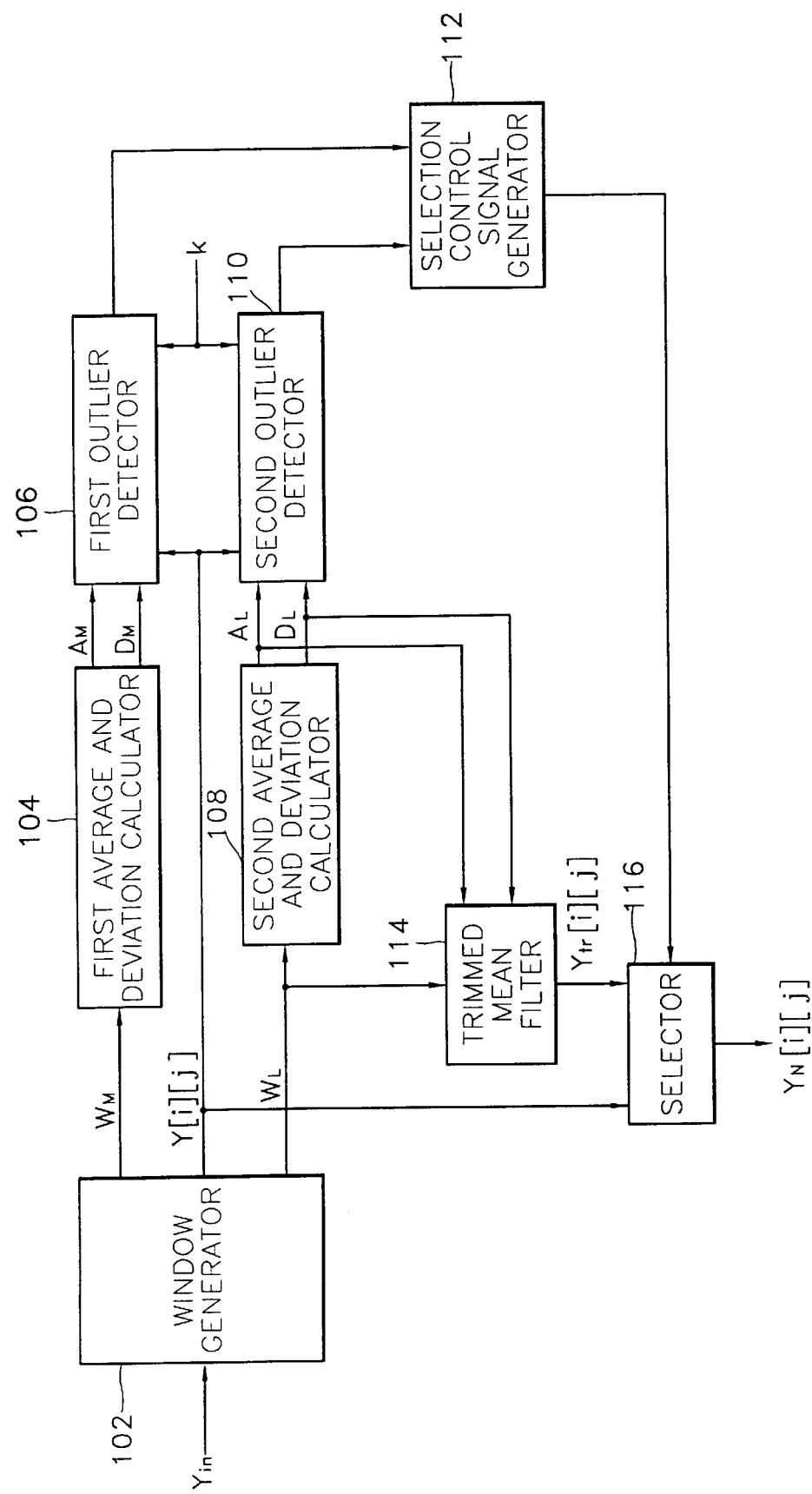
FIG. 4 is a block diagram of an embodiment of the noise reducing circuit according to the present invention.

FIG. 4 is the block diagram of an embodiment of the noise reduction circuit according to the present invention, in which a nonrecursive noise reduction mode is applied. Referring to FIG. 4, the noise reduction circuit includes a window generator 102, a first average and deviation calculator 104, a first outlier detector 106, a second average and deviation calculator 108, a second outlier detector 110, a selection control signal generator 112, a trimmed mean filter 114, and a selector 116.

The window generator 102 receives an input image signal $Y_{in}$, and generates and outputs 2 windows, i.e., a small window $W_M$ defined by the equation (1.1) and a large window $W_L$ defined by the equation (4.1) for the nonrecursive noise reduction mode. Also, the window generator 102 outputs a sample Y[i][j] in the center of the windows $W_L$ or $W_M$.

Figure 5:
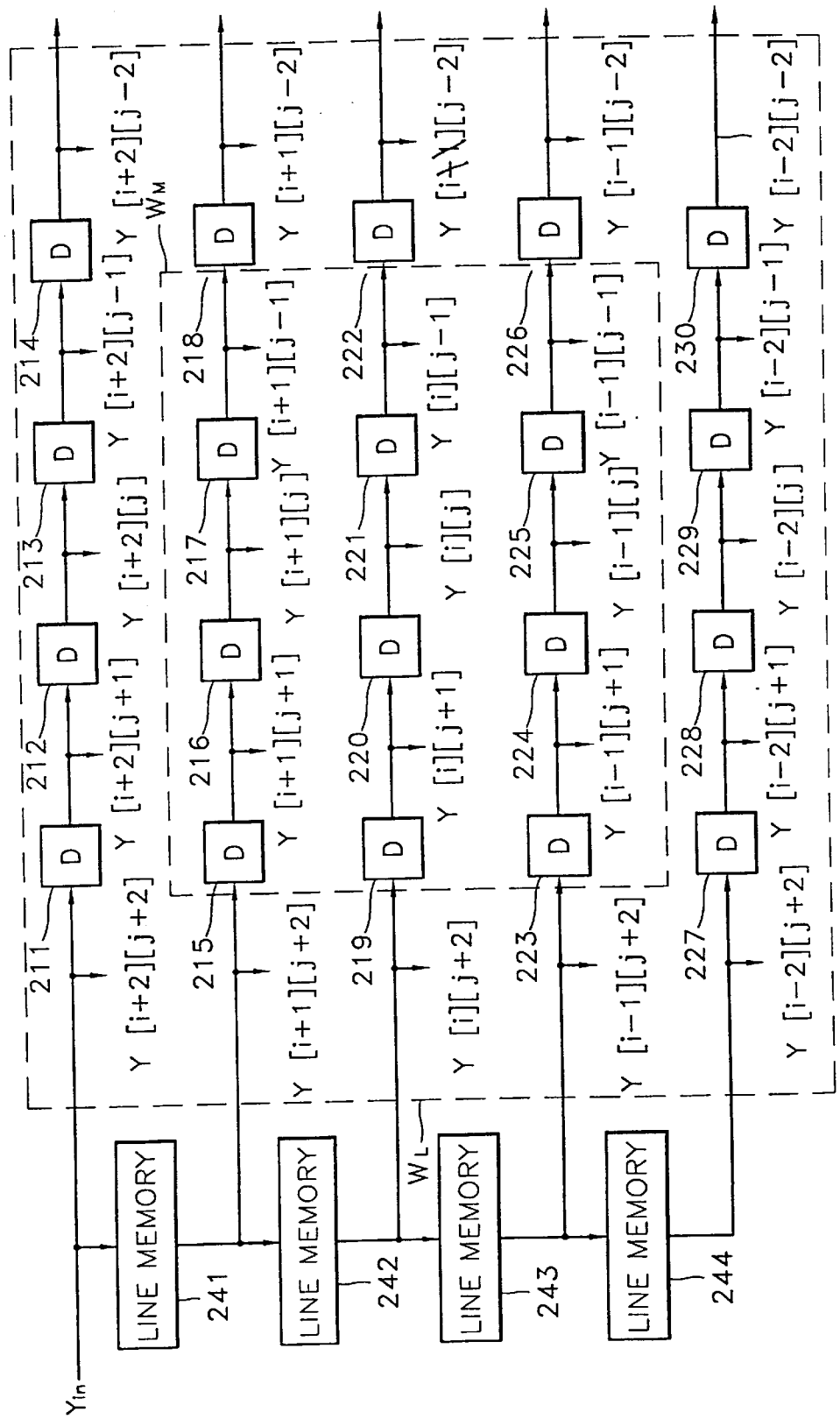
FIG. 5 is a detailed circuit diagram of the window generator shown in FIG. 4.

A detailed circuit diagram of the window generator 102 is shown in FIG. 5. The window generator 102 is comprised of sample delays 211 to 230 and four line memories 241 to 244. Here, the circuit is constituted for a case in which the size of the large window $W_L$ is (5×5) and that of the small window $W_M$ is (3×3). That is, the windows $W_L$ and $W_M$ are given as follows.

$$W_M = \begin{bmatrix} Y[i-1][j-1] & Y[i-1][j] & Y[i-1][j+1] \\ Y[i][j-1] & Y[i][j] & Y[i][j+1] \\ Y[i+1][j-1] & Y[i+1][j] & Y[i+1][j+1] \end{bmatrix} \quad (17)$$

$$W_L = \begin{bmatrix} Y[i-2][j-2] & Y[i-2][j-1] & Y[i-2][j] & Y[i-2][j+1] & Y[i-2][j+2] \\ Y[i-1][j-2] & Y[i-1][j-1] & Y[i-1][j] & Y[i-1][j+1] & Y[i-1][j+2] \\ Y[i][j-2] & Y[i][j-1] & Y[i][j] & Y[i][j+1] & Y[i][j+2] \\ Y[i+1][j-2] & Y[i+1][j-1] & Y[i+1][j] & Y[i+1][j+1] & Y[i+1][j+2] \\ Y[i+2][j-2] & Y[i+2][j-1] & Y[i+2][j] & Y[i+2][j+1] & Y[i+2][j+2] \end{bmatrix} \quad (18)$$

The first mean and deviation calculator 106 receives each sample of the small window $W_M$ from the window generator 102, and calculates the average sample value $A_M$ of the small window $W_M$ and the absolute deviation mean $D_M$ of the samples in the small window $W_M$ according to equations (2) and(3), respectively.

The first outlier detector 106 determines that the input sample Y[i][j] includes an impulse component and outputs a first outlier detection signal if the absolute difference between the input sample Y[i][j] and the average sample value $A_M$ of the small window $W_M$ is larger than the absolute deviation mean $D_M$ multiplied by a constant k, i.e., $|Y[i][j]-A_M|>kD_M$.

The second mean and deviation calculator 108 receives each sample of the large window $W_L$ from the window generator 102, and calculates the average sample value $A_L$ of the large window $W_L$ and the absolute deviation mean $D_L$ of the samples in the large window $W_L$ according to equations (5) and (6), respectively.

The second outlier detector 110 determines that the input sample Y[i][j] includes an impulse component and outputs a second outlier detection signal if the absolute difference between the input sample Y[i][j] and the average sample value $A_L$ of the large window $W_L$ is larger than the absolute deviation mean $D_1$ multiplied by the constant k, i.e., $|Y[i][j]-A_L|>kD_L$.

The selection control signal generator 112 generates a selection control signal and outputs such signal to the selector 116 so that the selector 116 selects the output of a trimmed mean filter 114 if both the first and second outlier detection signals are output by the first and second outlier detectors 106 and 110, respectively; otherwise the selector 116 selects the input sample Y[i][j] just as it is.

The trimmed mean filter 114 trims the samples of the small window $W_M$ from the window generator 102 according to the equation (10). Although the embodiment of the present invention uses the small window $W_M$ as a trimming window, the trimming window can have a different size.

The selector 116 receives the input sample Y[i][j] and the trimmed sample $Y_{tr}$[i][j], and selects one of such sample values to output as the final output signal $Y_N$[i][j]. Specifically, the selector 116 outputs $y_{tr}$[i][j] from the trimmed mean filter 114 when the outliers are detected in the first and second outlier detectors 106 and 110, and otherwise bypasses the input sample Y[i][j] from the window generator 102 just as it is.

Figure 6:
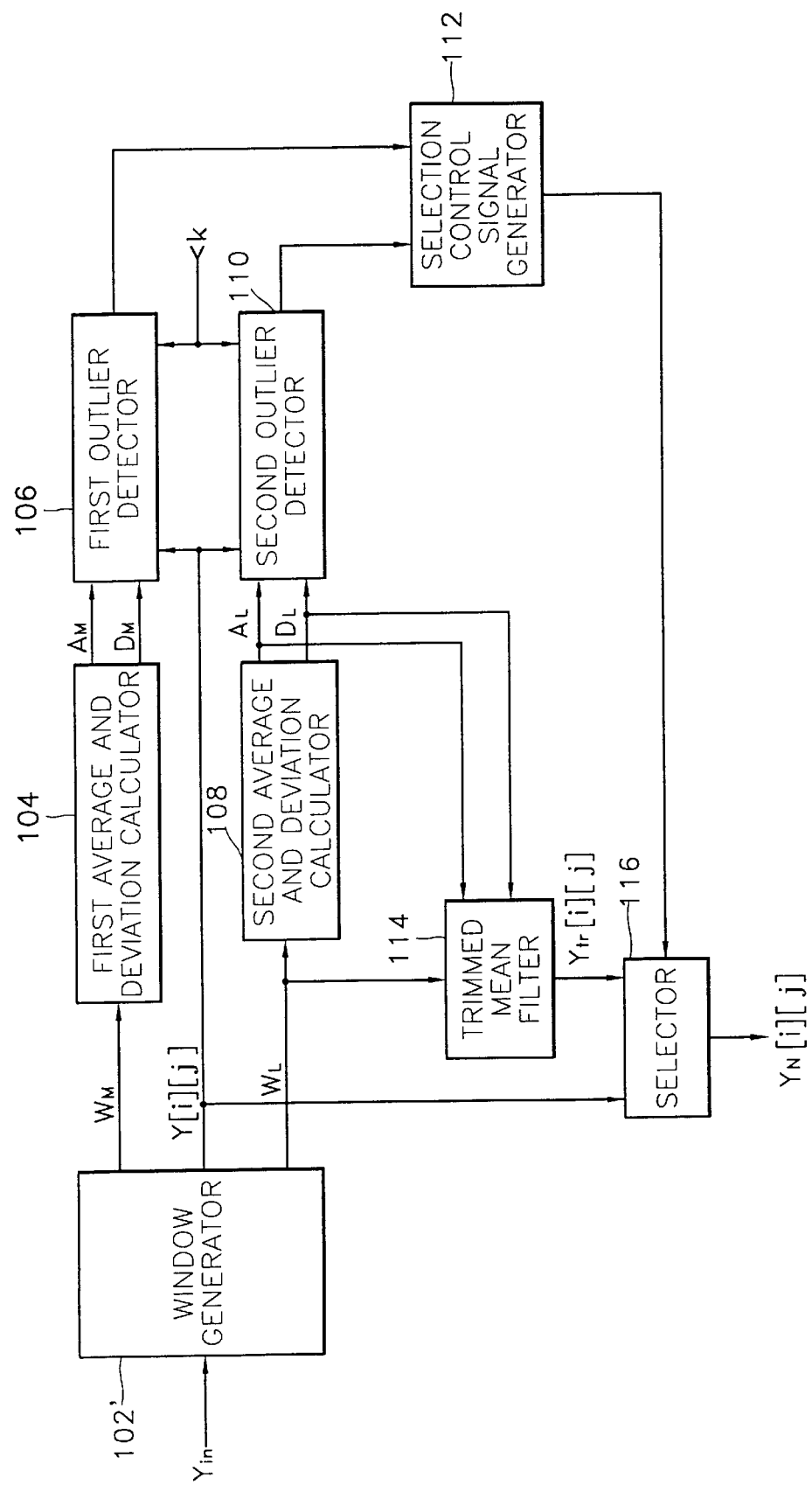
FIG. 6 is a block diagram of another embodiment of the noise reducing circuit according to the present invention.
Figure 7:
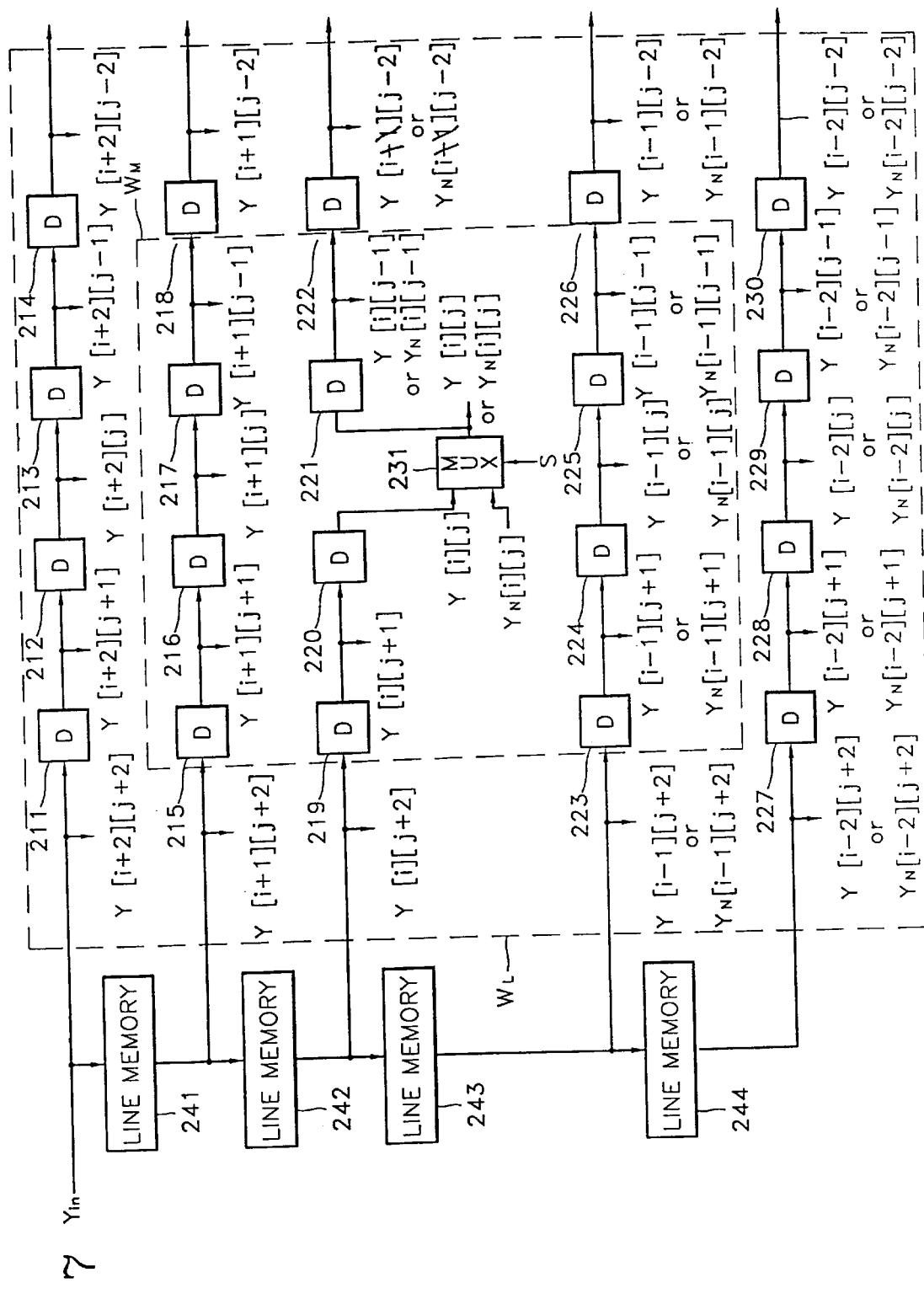
FIG. 7 is a detailed circuit diagram of the window generator shown in FIG. 6.

FIG. 6 is the block diagram of another embodiment of the noise reduction circuit of the present invention, in which a recursive/nonrecursive noise reduction modes are applied. Here, the same reference numerals are designated to the elements which are the same as those in FIG. 4, and the description of their operation is omitted.

Referring to FIG. 6, a window generator 102' receives a final output $Y_N$[i][j] fed back from the selector 116, and replaces an input sample Y[i][j] with the feedback signal $Y_N$[i][j].

A detailed circuit diagram of the window generator 102' is shown in FIG. 5. The window generator 102' further includes a multiplexer 231 in addition to the sample delays 211 to 230 and four line memories 241 to 244. Here, the multiplexer 231 selects the input sample Y[i][j] or the feedback signal $Y_N$[i][j] depending on the recursive/ nonrecursive mode control signal (S) which is provided externally. Specifically, the multiplexer 231 selects the input sample Y[i][j] in a nonrecursive mode and the feedback signal $Y_N$[i][j] in a recursive mode.

Accordingly, in the recursive mode, the small window $W_M$ of size (3×3) and the large window $W_L$ of size (5×5) generated by the window generator 102' are given as follows.

The horizontal filter 118 carries out a vector operation for a central row vector of the large window $W_L$ generated by the window generator 112 and a predetermined weighted vector to output the operation result. At this time, the central row vector $V_L$ of the large window defined by the equation (14) can be represented as follows.

$$V_L = \begin{cases} [Y[i][j-2], Y[i][j-1], Y[i][j], Y[i][j+1], Y[i][j+2]] \\ \qquad \text{... in nonrecursive mode} \\ [Y_N[i][j-2], Y_N[i][j-1], Y[i][j], Y[i][j+1], Y[i][j+2]] \\ \qquad \text{... in recursive mode} \end{cases} \quad (21)$$

Here, the predetermined weighted vector has the characteristic of a high-pass filter.

The absolute value circuit 120 receives the operation result from the horizontal filter 118 and calculates the absolute value of the operation result to output a horizontal amount H. At this time, the horizontal amount H output by the absolute value circuit 120 is represented by the equation (15).

The comparator 122 compares the horizontal amount H output from the absolute value circuit 120 with a predetermined constant T, and generates a comparison control signal if the horizontal amount H is larger than the constant T.

The selector 116' selects the output $y_{tr}$[i][j] which is trimmed by the trimmed mean filter 114 or the input sample Y[i][j] according to a selection control signal generated by the selection control signal generator 112 and a comparison control signal generated in the comparator 122. Specifically, the selector 116 selects the trimmed output $y_{tr}$[i][j] when it receives both the selection control signal and the comparison control signal. In the other cases, the selector 116 selects the sample Y[i][j]. Otherwise, the selector 116 outputs the selected value as the final output $Y_N$[i][j].

As described above, the present invention effectively removes outliers due to the impulse and improves picture quality.

Also, the present invention effectively removes noise even when a severe impulse exists.

Furthermore, according to the present invention, the aliasing around the low horizontal frequency region due to the interlaced image in the intra-field mode can be removed.

$$W_M = \begin{bmatrix} Y_N[i-1][j-1] & Y_N[i-1][j] & Y_N[i-1][j+1] \\ Y_N[i][j-1] & Y[i][j] & Y[i][j+1] \\ Y[i+1][j-1] & Y[i+1][j] & Y[i+1][j+1] \end{bmatrix} \quad (19)$$

$$W_L = \begin{bmatrix} Y_N[i-2][j-2] & Y_N[i-2][j-1] & Y_N[i-2][j] & Y_N[i-2][j+1] & Y_N[i-2][j \\ Y_N[i-1][j-2] & Y_N[i-1][j-1] & Y_N[i-1][j] & Y_N[i-1][j+1] & Y_N[i-1][j \\ Y_N[i][j-2] & Y_N[i][j-1] & Y[i][j] & Y[i][j+1] & Y[i][j+2] \\ Y[i+1][j-2] & Y[i+1][j-1] & Y[i+1][j] & Y[i+1][j+1] & Y[i+1][j- \\ Y[i+2][j-2] & Y[i+2][j-1] & Y[i+2][j] & Y[i+2][j+1] & Y[i+2][j- \end{bmatrix} \quad (20)$$

Meanwhile, in the nonrecursive mode, the small window $W_M$ of size (3×3) and the large window $W_L$ of size (5×5) generated by the window generator 102' are given by the equations (17) and (18).

Figure 8:
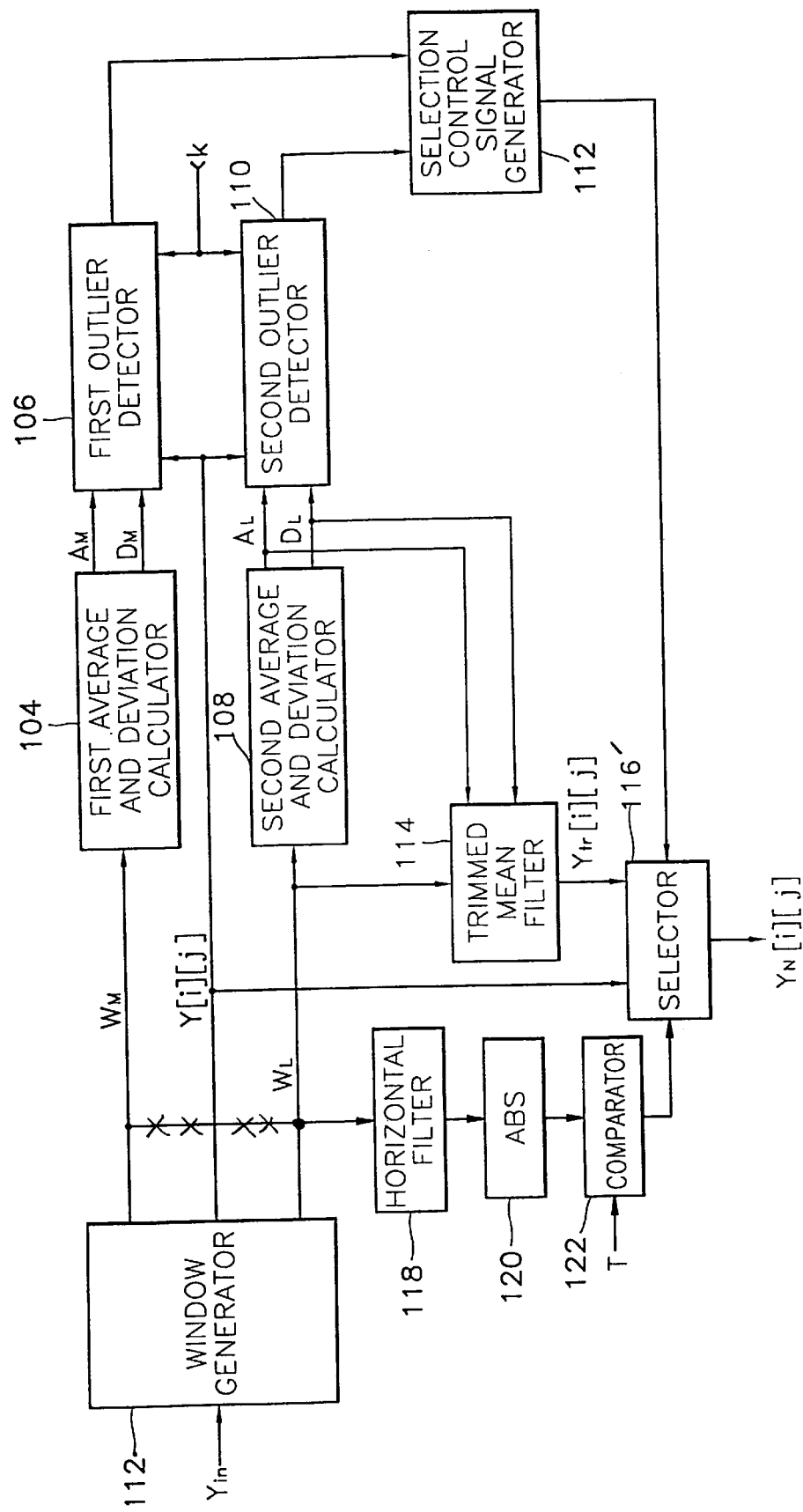
FIG. 8 is a block diagram of still another embodiment of the noise reducing circuit according to the present invention.

FIG. 8 is a block diagram of still another embodiment of the noise reduction circuit according to the present invention, which uses an image signal interlaced in an intra-field mode. Here, the same reference numerals are designated to the elements which are the same as those in FIG. 4, and the description of their operation is omitted.

Referring to FIG. 8, the noise reduction circuit includes a horizontal filter 118, an absolute value circuit 120 and a comparator 122.

What is claimed is:

1. A noise reduction method comprising the steps of:
   (a) generating a plurality of windows having different sizes and each of the plurality of windows including respective input samples and an output sample of a center of said plurality of windows;
   (b) obtaining respective average sample values and respective absolute deviation means of the respective samples of the plurality of windows;
   (c) detecting a presence of an impulse component in an input signal based on the respective average sample values and the respective absolute deviation means; and (d) trimming the samples in a window of a predetermined size of said plurality of windows when the impulse component exists in the input signal, otherwise, passing the output same.

2. A noise reduction method as claimed in claim 1, wherein, in said step (c), the impulse component is determined to be present in the input signal when the presence of the impulse component is detected with respect to at least two of the plurality of windows.

3. A noise reduction method for reducing impulse noise present in an input signal, comprising the steps of:

(a) generating a plurality of windows having different sizes and each of the plurality of windows including respective input samples and an output sample of a center of said plurality of windows;

(b) obtaining respective average sample values and respective absolute deviation means of the respective input samples of the plurality of windows;

(c) detecting a presence of an impulse component in an input signal based on the respective average sample values and the respective absolute deviation means;

(d) detecting a horizontal amount of said window of a predetermined size by performing a vector operation with respect to a horizontal vector of a first predetermined size including the respective input sample and a predetermined weighted vector; and (e) trimming samples in a window of a second predetermined size of said plurality of windows if the impulse component exists in the input signal and the detected horizontal amount is higher than a predetermined constant, otherwise passing the output sample.

4. A noise reduction method as claimed in claim 3, wherein, in said step (c), the impulse component is determined to be present in the input signal when the Presence of the impulse component is detected with respect to at least two of the plurality of windows.

5. A noise reduction method as claimed in claim 3, wherein, in said step (d), the weighted vector has a high-pass filter characteristic.

6. A noise reduction method for reducing impulse noise present in an input signal, comprising the steps of:

(a) generating a plurality of windows having different sizes and each of the plurality of windows including respective input samples and an output sample of a center of said plurality of windows;

(b) obtaining respective average sample values and respective absolute deviation means of the respective input samples of the plurality of windows;

(c) detecting a presence of an impulse component in an input signal based on the respective average sample values and the respective absolute deviation means;

(d) trimming the samples in a window of a first predetermined size of said plurality of windows when the impulse component exists in the input signal and outputting a trimmed signal as an output signal, otherwise, passing the output sample; and (e) replacing the input signal with the output signal, inputting a next sample and returning to said step (a).

7. A noise reduction method as claimed in claim 6, wherein, in said step (c), the impulse component is determined to be present in the input signal when the presence of the impulse component is detected with respect to at least two of the plurality of windows.

8. A noise reduction method for reducing impulse noise present in an input signal, comprising the steps of:

(a) generating a plurality of windows having different sizes and each of the plurality of windows including respective input samples and an output sample of a center of said plurality of windows;

(b) obtaining respective average sample values and respective absolute deviation means of the respective input samples of the plurality of windows;

(c) detecting a presence of an impulse component in an input signal based on the respective average sample values and the respective absolute deviation means;

(d) detecting a horizontal amount of said window of a predetermined size by performing a vector operation with respect to a horizontal vector of a first predetermined size including the respective input samples and a predetermined weighted vector; and (e) trimming samples in a window which is one of the plurality of windows and outputting a trimmed signal as an output signal if the impulse component exists in the input signal and the detected horizontal amount is higher than a predetermined constant, otherwise outputting the output sample as the output signal; and (f) replacing the input signal with the output signal, inputting a next sample and returning to said step (a).

9. A noise reduction method as claimed in claim 8, wherein, in said step (c), the impulse component is determined to be present in the input signal when the presence of the impulse component is detected with respect to at least two of the plurality of windows.

10. A noise reduction method as claimed in claim 8, wherein, in said step (d), the weighted vector has a high-pass filter characteristic.

11. A noise reduction circuit for reducing noise by suppressing a detected impulse component in an input signal, comprising:

window generating means for generating a plurality of windows of different sizes, each of the plurality of windows including respective input samples and an output sample of a center of said plurality of windows;

means for obtaining respective average sample values and respective absolute deviation means of the respective input samples of the plurality of windows;

outlier detecting means for determining whether the input signal is an outlier, and therefor contains an impulse component, based on the average sample values and the absolute deviation means and outputting outlier detection signals when it is determined that the input signal is an outlier;

means for generating selection control signal responsive to said outlier detection signals indicating the input signal is said outlier in said outlier detecting means;

trimming means for trimming said respective input samples in a window of a predetermined size of said plurality of windows and outputting a trimmed signal; and selection means for outputting the trimmed signal as an output signal when the outlier detecting means determines that the input signal is said outlier, otherwise outputting the output sample as the output signal, in accordance with the selection control signal.

12. A noise reduction circuit as claimed in claim 11, wherein said window generating means generates said plurality of windows in a recursive mode.

13. A noise reduction circuit as claimed in claim 11, further comprising:

means for detecting a horizontal amount with respect to a horizontal vector of a predetermined size including the respective input samples of said window of a predetermined size by perform a vector operation with respect to a horizontal vector of a predetermined size including the respects input sample and a predetermined weighted vector; and comparing means for comparing the horizontal amount with a predetermined constant to generate a comparison control signal to said selection means when the horizontal amount is greater than the predetermined constant;

whereby said selection means outputs the trimmed signal as the output signal only when the outlier detecting means determines that the input signal is said outlier and when said comparing means generates the comparison control signal.

14. A noise reduction circuit as claimed in claim 13, wherein said selection means outputs the trimmed signal when the selection control signal and comparison control signal are received, and otherwise outputs the output sample as the output signal.

15. A noise reduction circuit as claimed in claim 12, further comprising:

means for detecting a horizontal amount by performing a vector operation with respect to a horizontal vector of a predetermined size including the input sample and a predetermined weighted vector; and comparing means for comparing the horizontal amount with a predetermined constant to generate a comparison control signal.

16. A noise reduction circuit as claimed in claim 15, wherein said selecting means outputs the trimmed signal when the selection control signal and comparison control signal are received, and otherwise outputs the input signal unchanged as the output signal.

17. A noise reduction circuit as claimed in claim 11, wherein said window generating means generates first and second windows having different sizes as the plurality of windows.

18. A noise reduction circuit as claimed in claim 17, wherein said outlier detecting means comprises:

a first outlier detector coupled to said first window for determining that a first input sample of said first window includes a first impulse component when a first absolute difference between the first input sample and the respective average sample value of the first window is greater than the respective absolute deviation mean of the first window multiplied by a predetermined constant and outputting a first outlier detection signal; and a second outlier detector for determining that a second input sample of said second window includes a second impulse component when a second absolute difference between the second input sample and the average sample value of the second window is greater than the absolute deviation mean of the second window multiplied by said predetermined constant and outputting a second outlier detection signal.

19. A noise reduction circuit as claimed in claim 11, wherein said trimming means is a trimmed mean filter.

20. A noise reduction circuit as claimed in claim 11, wherein each of said plurality of windows is constituted by the respective input samples of a two-dimensional video signal.

21. A noise reduction circuit as claimed in claim 11, wherein each of said plurality of windows is constituted by the respective input samples of a one-dimensional communication signal.

* * * * *